United States Patent [19]
McDougald

[11] Patent Number: 5,792,359
[45] Date of Patent: *Aug. 11, 1998

[54] SEALING SHOE FOR CELLESS TRAVELLING BRIDGE FILTER

[75] Inventor: Mack McDougald, Ochlocknee, Ga.

[73] Assignee: U.S. Filter Corporation, Thomasville, Ga.

[ * ] Notice: The term of this patent shall not extend beyond the expiration date of Pat. No. 5,431,809.

[21] Appl. No.: 852,029

[22] Filed: May 6, 1997

Related U.S. Application Data

[63] Continuation of Ser. No. 676,490, Jul. 8, 1996, abandoned.
[51] Int. Cl.⁶ ............................................. B01D 24/46
[52] U.S. Cl. ................. 210/678; 210/793; 210/794; 210/797; 210/798; 210/264; 210/274; 210/275; 210/108
[58] Field of Search ........................... 210/264, 274, 210/275, 271, 108, 273, 279, 291, 293, 272, 670, 678, 793, 798, 791, 792, 794, 795, 797

[56] References Cited

U.S. PATENT DOCUMENTS

| | | | |
|---|---|---|---|
| Re. 23,009 | 6/1948 | Camp | 210/293 |
| Re. 28,458 | 7/1975 | Ross | 210/80 |
| 607,155 | 7/1898 | Bleakly et al. | 210/279 |
| 647,780 | 4/1900 | Hodkinson | 210/271 |
| 668,127 | 2/1901 | Hodkinson | 210/271 |
| 722,581 | 3/1903 | Hodkinson | 210/271 |
| 891,998 | 6/1908 | Knight | 210/271 |
| 1,383,384 | 7/1921 | Brown | 210/276 |
| 1,408,228 | 2/1922 | Sirch | 210/279 |
| 1,604,379 | 10/1926 | Blaisdell | 210/273 |
| 1,718,767 | 6/1929 | Wade | 210/271 |
| 1,787,698 | 1/1931 | Montgomery | 210/273 |
| 2,156,291 | 5/1939 | Hurt | 210/128 |
| 2,194,071 | 3/1940 | Hine | 210/280 |
| 2,217,689 | 10/1940 | Laughlin | 210/273 |
| 2,229,894 | 1/1941 | Kayser | 210/128 |
| 2,235,227 | 3/1941 | Lose, Jr. | 210/128 |
| 2,263,964 | 11/1941 | Camp | 210/292 |
| 2,302,449 | 11/1942 | Laughlin | 210/275 |
| 2,302,450 | 11/1942 | Laughlin | 210/279 |
| 2,311,594 | 2/1943 | Lose, Jr. | 210/128 |
| 2,396,769 | 3/1946 | Asch | 210/128 |
| 2,442,594 | 6/1948 | Fraser | 210/128 |

(List continued on next page.)

FOREIGN PATENT DOCUMENTS

| | | |
|---|---|---|
| 2 252 118 | 6/1975 | France . |
| 868139 | 5/1961 | United Kingdom . |

OTHER PUBLICATIONS

"ENELCO® Water Treatment Systems . . . ", Environmental Elements Corporation, 1979.
"ENELCO® Engineered Polymer Polyethylene Under Drain Support Plates", Environmental Elements Corporation, 1979.
"Filtros Product Bulletin", No. UP-568, Electro Refractories & Abrasives, division of Ferro Corporation.
SYBRON/Loepold Catalog No. 5-977, "Dual-Lateral Air/ Water Filter Underdrain" (undated).

*Primary Examiner*—Cynthia L. Nessler
*Attorney, Agent, or Firm*—Nixon & Vanderhye P.C.

[57] ABSTRACT

A backwash sealing shoe is provided for a filtration system including a tank having an undivided filtration bed and a plurality of side-by-side headers within the bed, each header in communication with a respective port in a wall of the tank. The sealing shoe includes a hydraulic section including an opening surrounded by a seal and adapted to sealingly engage the wall in surrounding relationship to at least one of the ports; and at least one blocking section adjacent the hydraulic section on one side thereof and including a plate surrounded by a seal and adapted to sealingly engage the wall in surrounding relationship to at least one adjacent port to thereby block flow from the tank through at least one adjacent port during a backwash operation.

20 Claims, 6 Drawing Sheets

U.S. PATENT DOCUMENTS

| | | | |
|---|---|---|---|
| 2,459,353 | 1/1949 | Woods | 210/144 |
| 2,679,319 | 5/1954 | Walker | 210/130 |
| 3,049,238 | 8/1962 | Whitlock | 210/279 |
| 3,178,026 | 4/1965 | Christy | 210/293 |
| 3,239,061 | 3/1966 | Horning et al. | 210/273 |
| 3,247,971 | 4/1966 | Kastler | 210/291 |
| 3,262,878 | 7/1966 | Beckley et al. | 210/53 |
| 3,322,284 | 5/1967 | Moore | 210/274 |
| 3,533,507 | 10/1970 | Aitken | 210/140 |
| 3,552,572 | 1/1971 | Lehmann | 210/271 |
| 3,615,019 | 10/1971 | Early, Jr. | 210/293 |
| 3,907,686 | 9/1975 | Fletcher et al. | 210/259 |
| 3,984,326 | 10/1976 | Bendel | 210/264 |
| 4,032,443 | 6/1977 | Ross | 210/82 |
| 4,065,391 | 12/1977 | Farabaugh | 210/274 |
| 4,082,664 | 4/1978 | Lindstol | 210/80 |
| 4,133,766 | 1/1979 | Adie | 210/275 |
| 4,152,265 | 5/1979 | Meyers | 210/273 |
| 4,211,656 | 7/1980 | Cochrane | 210/149 |
| 4,235,718 | 11/1980 | Lopez | 210/291 |
| 4,308,141 | 12/1981 | Clendenen | 210/264 |
| 4,379,050 | 4/1983 | Hess et al. | 210/151 |
| 4,450,077 | 5/1984 | Black et al. | 210/275 |
| 4,454,034 | 6/1984 | Astrom et al. | 210/108 |
| 4,486,307 | 12/1984 | Weiler | 210/793 |
| 4,537,687 | 8/1985 | Piper | 210/793 |
| 4,540,487 | 9/1985 | Johnson et al. | 210/264 |
| 4,617,131 | 10/1986 | Walker | 210/794 |
| 4,624,783 | 11/1986 | Black et al. | 210/271 |
| 4,659,462 | 4/1987 | Chapman | 210/202 |
| 4,661,258 | 4/1987 | Phillips | 210/291 |
| 4,746,431 | 5/1988 | Gibaud et al. | 210/293 |
| 4,753,726 | 6/1988 | Suchanek | 210/279 |
| 4,764,288 | 8/1988 | Walker et al. | 210/793 |
| 4,765,889 | 8/1988 | Grujanac | 210/121 |
| 4,859,330 | 8/1989 | Pauwels | 210/264 |
| 4,957,631 | 9/1990 | Pauwels | 210/264 |
| 4,988,439 | 1/1991 | Medders, II | 210/274 |
| 5,066,393 | 11/1991 | Padera et al. | 210/291 |
| 5,068,034 | 11/1991 | Walter | 210/232 |
| 5,078,873 | 1/1992 | Black et al. | 210/264 |
| 5,087,362 | 2/1992 | Brown | 210/293 |
| 5,089,117 | 2/1992 | Nichols | 210/93 |
| 5,108,627 | 4/1992 | Berkebile et al. | 210/793 |
| 5,118,419 | 6/1992 | Evans et al. | 210/291 |
| 5,137,645 | 8/1992 | Miller | 210/793 |
| 5,147,560 | 9/1992 | Nichols | 210/275 |
| 5,149,427 | 9/1992 | Brown et al. | 210/274 |
| 5,156,738 | 10/1992 | Maxson | 210/274 |
| 5,160,613 | 11/1992 | Walter | 210/274 |
| 5,160,614 | 11/1992 | Brown | 210/275 |
| 5,232,592 | 8/1993 | Brown et al. | 210/274 |
| 5,269,920 | 12/1993 | Brown et al. | 210/274 |
| 5,288,398 | 2/1994 | Angelino | 210/275 |
| 5,328,608 | 7/1994 | Bergmann et al. | 210/274 |
| 5,362,384 | 11/1994 | Whetsel | 210/275 |
| 5,401,405 | 3/1995 | McDougald | 210/275 |
| 5,431,809 | 7/1995 | McDougald | 210/264 |
| 5,476,584 | 12/1995 | McDougald | 210/264 |
| 5,536,417 | 7/1996 | Angelino | 210/264 |
| 5,552,045 | 9/1996 | Wagner, Jr. | 210/264 |
| 5,554,281 | 9/1996 | McDougald | 210/273 |

5,792,359

SEALING SHOE FOR CELLESS TRAVELLING BRIDGE FILTER

This is a continuation of application Ser. No. 08/676,490, filed 8 Jul. 1996, now abandoned This invention relates to travelling bridge filtration systems and, more specifically, to a unique backwash sealing shoe for a celless travelling bridge filtration system.

BACKGROUND AND SUMMARY OF THE INVENTION

It is well known in the art to utilize filtration tanks divided into a plurality of filter cells, one adjacent the other, and all containing a multi-layer or single layer arrangement of granular filter media such as sand, gravel and the like. In downward flow filtration systems of this type, water or other liquid containing suspended solid particles is introduced into the filtration tank from above, and clarified water is drawn off from a chamber either beneath or adjacent the individual filter cells. During downward flow through the individual cells, particulate matter is entrapped within the layer or layers of granular filter media, but eventually, the particulate matter clogs the filter media, thereby reducing the filtering capability of the system. Thus, there is a need for a periodic cleaning of the filter cells. It is also known to maintain such units in continuous operation during cleaning by the use of travelling bridge devices which move from one filter cell to the next, cleaning individual cells while permitting the filtration process to continue in the remaining cells.

Examples of travelling bridge apparatus of this type may be found in U.S. Pat. Nos. 5,089,117; 4,988,439; 4,957,631; 4,859,330; 4,764,288; 4,617,131; 4,540,487; 4,486,307; 4,133,766; 3,984,326; 2,235,227; and 2,302,449. Typically, travelling bridge systems include an overhead carriage, movable along tracks, guideways or the like, which carry a backwash hood which is either successively engageable with the open upper end of each filter cell, or which passes over the filter bed in close proximity to the media surface. For a downflow type filter, backwashing is achieved by introduction of water or other treatment liquid by a backwash pump into the cell from below in a counterflow arrangement to the normal filtering direction. The backwash hood typically includes a suction head (i.e., a waste water pump) for drawing out fluid and debris forced to the surface of the filter cell as a result of the backwash. As the backwash of individual cells is completed, the travelling bridge moves the backwash hood to the next adjacent cell.

Typically, the filter media in each cell is supported above the bottom wall or floor of the tank by an underdrain structure which, in most existing designs, comprises fused porous polethylene plates, or porous alumina oxide plates or perforated plates. The filter media is placed directly on the underdrain plates which, in turn, are supported on horizontal shelves on adjacent, vertically oriented filter cell dividers. An L-shaped angle bracket or other retaining device is bolted through the cell dividers snugly on top of the underdrain plate to act as a means of capturing the underdrain plate. This is necessary because of the uplift exerted when flow is reversed through the underdrain plate by the backwash pump during a backwash cycle. There are, however, a number of problems with this type of underdrain as described in commonly owned copending application Ser. No. 08/379,112 (now allowed).

In the latter application, an underdrain design for travelling bridge filtration systems is disclosed which includes a plurality of lateral pipe headers for dosing and backwash distribution as well as media support. Each pipe header is equipped with orifices or slots which are sized and spaced in accordance with hydraulic design and desired media grain size retention. The underdrain pipe headers are not attached to any vertical cell dividers but are self-supporting structures in and of themselves. In fact, in the '112 application, one embodiment is disclosed which completely eliminates the need for individual cell dividers.

In those travelling bridge filters which do utilize cell dividers, the latter serve to direct the flow of backwash water upward toward the backwash collection hood. The cell divider is also utilized as a baffle to prevent short-circuiting of backwash water by crossing over to adjacent cells and exiting back out the filter into the filtrate channel before rising through the filter media and performing the task of fluidization and media cleansing. In some designs, the cell divider also acts as a support for the underdrain and as a structural member forming the walls of the distribution plenum for the pressurized backwash water.

In accordance with this invention, a celless travelling bridge system is utilized in combination with a unique backwash sealing shoe which prevents escape of the backwash water to adjacent underdrain laterals by blocking the outlet from those laterals to the filtrate channel. Effectively, no flow exits the laterals covered by the blocking section of the backwash shoe on either side of the lateral or laterals undergoing backwash. One or more adjacent laterals may be blocked by each blocking section depending on the depth of the filter media and the spacing between the laterals. This makes the path of least resistance of hydraulic flow up and into the backwash hood. If the backwash sealing shoe did not have the blocking sections on either side of the hydraulic backwash section, and absent cell dividers, the path of least resistance would be into an adjacent open lateral and out into the filtrate channel, preventing media fluidization from occurring and thereby destroying backwash integrity.

There are very significant economic advantages which flow from the present invention:

1. Cell dividers that normally are used to divide the filter bed into distinct compartments are not required. This results in substantial capital cost savings in equipment;

2. Since cell dividers are eliminated, construction or installation costs are substantially reduced; and 3. The overall savings of capital and construction cost results in significant installed cost savings over systems which utilize cell dividers.

Operationally, performance of the newly disclosed celless system is at least equal to any system which does utilize cell dividers.

In accordance with the exemplary embodiment of the invention, the backwash sealing shoe comprises a center hydraulic section which conveys backwash water from the backwash shoe assembly into the lateral serving the section of the filter bed undergoing backwash. This center hydraulic section may be designed to supply backwash water to one or more laterals simultaneously. On either side of the hydraulic center section, a blank blocking section is provided which covers one or more adjacent laterals on either side of the lateral(s) undergoing backwash. The face of each section is equipped with a resilient seal to seal between the backwash shoe section and the face of the underdrain laterals. In addition, the blocking section on either side of the center hydraulic section, are spring loaded so as to accommodate any irregularities in the filtration tank wall.

It should be understood that the sealing mechanism per se utilized in both the center hydraulic center and the adjacent blocking sections is not limited to the specific embodiment disclosed herein.

Accordingly, in accordance with its broader aspects, the present invention relates to a backwash sealing shoe for a filtration system including a tank having an undivided filtration bed and a plurality of side-by-side headers or other underdrain devices within the bed, each header in communication with a respective port in a wall of the tank, the sealing shoe comprising a hydraulic section including an opening surrounded by a seal and adapted to sealingly engage the wall in surrounding relationship to at least one of the ports; and at least one blocking section adjacent the hydraulic section on one side thereof and including a plate surrounded by a seal and adapted to sealingly engage the wall in surrounding relationship to at least one adjacent port to thereby block flow from the tank through the at least one adjacent port during a backwash operation.

In another aspect, the invention provides a travelling bridge filtration apparatus including a tank having a pair of side walls, a pair of end walls and a floor, and a downflow filtration bed including one or more layers of filter media located in the tank, a bridge adapted to travel across the top of the tank, the bridge supporting a backwash pump, a backwash hood and enclosed waste water removal manifold, and wherein the tank further includes a filtrate channel for removing filtered effluent from the tank, the improvement wherein the filtration bed is not partitioned and wherein an underdrain is provided which comprises a plurality of hollow, tubular headers extending in horizontally spaced relationship through the bed and in communication with the filtrate channel; each tubular header being provided with a plurality of apertures along its length; and further wherein the backwash pump is selectively engageable with each of the plurality of hollow tubular headers by means of a sealing shoe constructed to provide access to one or more headers while simultaneously blocking access to one or more adjacent headers.

Objects and advantages of the subject invention in addition to those described above will become apparent from the detailed description which follows.

DETAILED DESCRIPTION OF THE DRAWINGS

Figure 1:
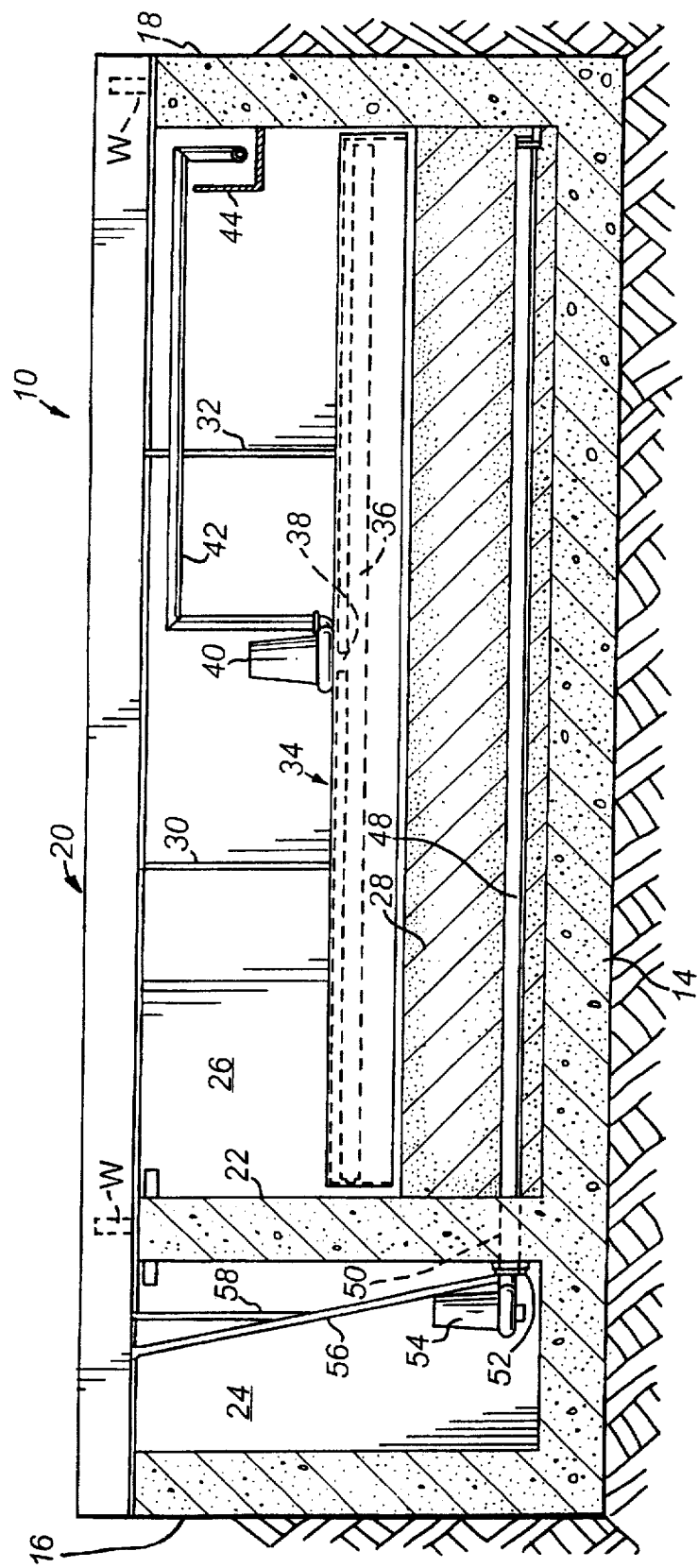
FIG. 1 is a cross section taken through a travelling bridge filtration unit in accordance with this invention.

With reference now to FIG. 1, a travelling bridge backwash system 10 is shown to include a tank 12 of concrete (or steel) construction consisting of a bottom wall or floor 14, a pair of side walls 16, 18, and a pair of end walls (not shown). A travelling bridge 20 (illustrated essentially schematically for the sake of simplicity and convenience with many of its conventional components omitted), is mounted atop the device for movement along the tank via wheels W, in a direction parallel to the side walls 16, 18 and in the longitudinal direction of the tank. The manner in which the bridge 20 is mounted and its associated drive are conventional in the art and form no part of this invention.

The tank 12 also includes an interior partition 22, in proximity to the side wall 16 and extending parallel thereto, along the length of the tank between the end walls. This partition 22 serves to divide the tank into a relatively large filter basin 26 and a relatively smaller filtrate channel 24.

The filter basin 26 is provided with a bed 28 of filter media which may comprise one or more layers of granular material, conventionally used in gravity type filtration systems. In this exemplary embodiment, the filter basin is configured as a single filter cell (also see FIG. 2), without the conventional vertically oriented dividers which are otherwise used to divide the filter basin into a plurality of individual cells (running parallel to the end walls, transversely between partition 22 and side wall 18).

Suspended from the bridge 20 by struts 30, 32 is a backwash hood 34 which also extends transversely of the tank, substantially between the partition 22 and side wall 18 and in close proximity to the bed 28. The hood encloses a backwash header 36 which is connected to an inlet 38 of a waste water pump 40 mounted externally of the hood 34. The discharge conduit 42 runs to a backwash trough 44 fixed to the inside of side wall 18 and also runs the length of the tank. In this way, the discharge outlet 42 can travel freely within the trough 44 as the bridge 20 travels the length of the tank 12. It will be appreciated that the pump 40 may also be mounted on the bridge 20. It will also be appreciated that the hood 34 is mounted for vertical movement (by any suitable means) relative to the bridge 20, toward and away from the bed 28, for reasons provided further below.

Figure 2:
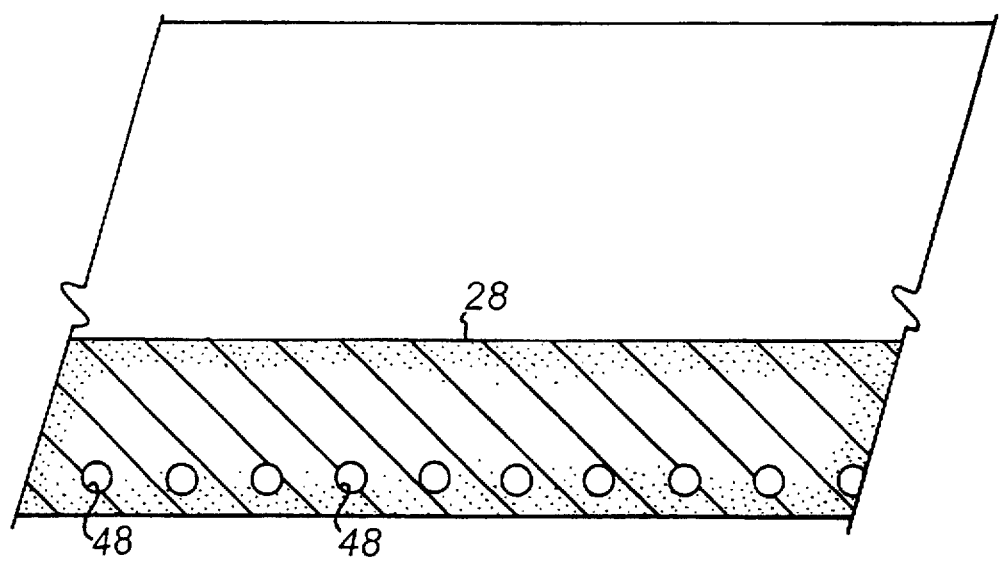
FIG. 2 is a partial side section of the travelling bridge filtration unit illustrated in FIG. 1.
Figure 3:
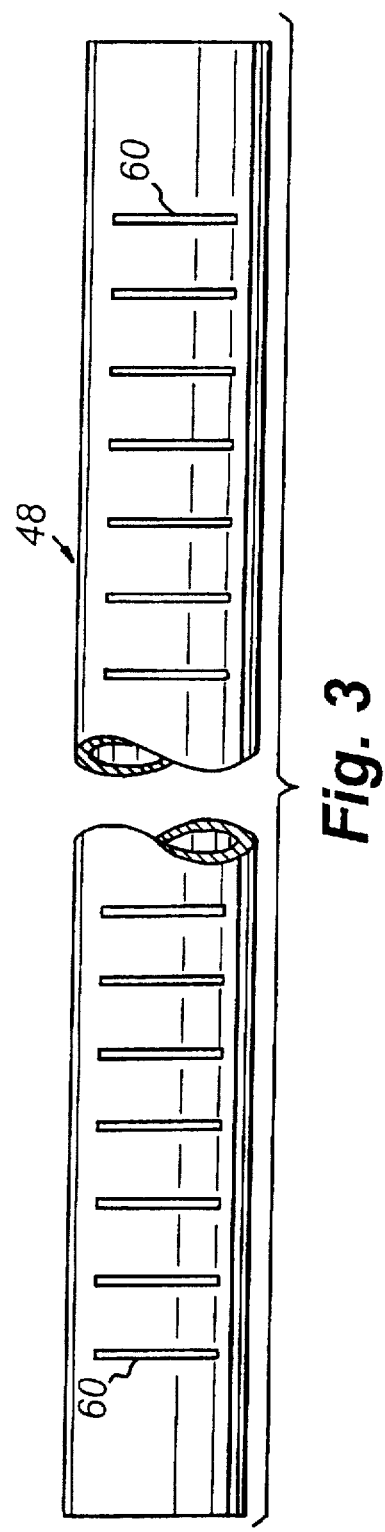
FIG. 3 is a cross section taken through a lateral header in accordance with this invention.

Within the filter media bed 28, and in proximity to the bottom wall or floor 14, there are arranged a plurality of underdrain pipe headers 48 which, as best seen in FIGS. 1 and 2 extend in laterally spaced relationship at a substantially uniform height within the filter bed media. Each tubular manifold or pipe header 48 is supported at opposite ends by the side wall 18 and partition 22 by suitable means. Thus, it will be appreciated that the manifolds extend transversely of the filter basin length, and parallel with the hood 34.

The end of each header 48 closest the side wall 18 is closed, while the opposite end opens through the partition 22 at a port 50. The port 50 of each header is designed to be engaged by a backwash sealing shoe 52 which, in turn, connects to a main backwash pump 54. The latter is secured to the bridge 20 by braces 56, 58 (or other suitable means) for movement therewith along the length of the tank 12 adjacent the partition 22. With reference now to FIGS. 4–8, the backwash sealing shoe in accordance with this invention will be described in detail.

Referring to FIGS. 4–8, the sealing shoe 52 includes a sealing body 60 which is divided into three sections: a center hydraulic section 62 and a pair of blank, blocking sections 64 and 66, one on either side of the center hydraulic section. The latter includes a rectangular opening 68 surrounded by a seal 70 which sealingly engages the partition 22 in an area which surrounds one or more of the ports 50 connected to the lateral headers 36. The opening 68 in the sealing shoe connects to a conduit 72 which is adapted to be connected to the main backwash pump 54. It will be appreciated that the specific construction of the conduit 72 will be modified or adapted as required to attach to a specific backwash pump configuration.

Brackets or angles 74, 76 extend rearwardly from the sealing shoe 52 and are adapted to connect to a sealing shoe actuating mechanism of the type described in commonly owned copending application Ser. No. 08/179,693 filed Jan. 11, 1994, the subject matter of which is incorporated herein by reference. It should be noted, however, that the actuating mechanism by which the sealing shoe is moved into and out of engagement with the tank partition wall 22 forms no part of this invention per se.

The blocking sections 64 and 66 are identical and therefore, only one need be described in detail. Thus, the blocking section 64 includes a rectangular plate 78 surrounded by a resilient flexible seal 80. The plate 78 is provided with a pair of rods 82, 84 which extend rearwardly from the plate 78 and are secured in the body 60. Springs 86 are utilized to bias the plate 78 in a direction away from the sealing shoe, i.e., towards the partition 22. This spring loaded arrangement allows the rectangular blocking section plate 78 and its associated seal 80 to sealingly engage the partition wall 22 in surrounding relationship to one or more adjacent ports 50, even if the partition 22 has surface irregularities which could not otherwise be accommodated by the resiliency and flexibility of the seal material 80. In the case of the center hydraulic section, the section 62 is substantially rigid so that flexibility and resiliency with respect to the sealing function is achieved solely by means of the seal 70.

Figure 4:
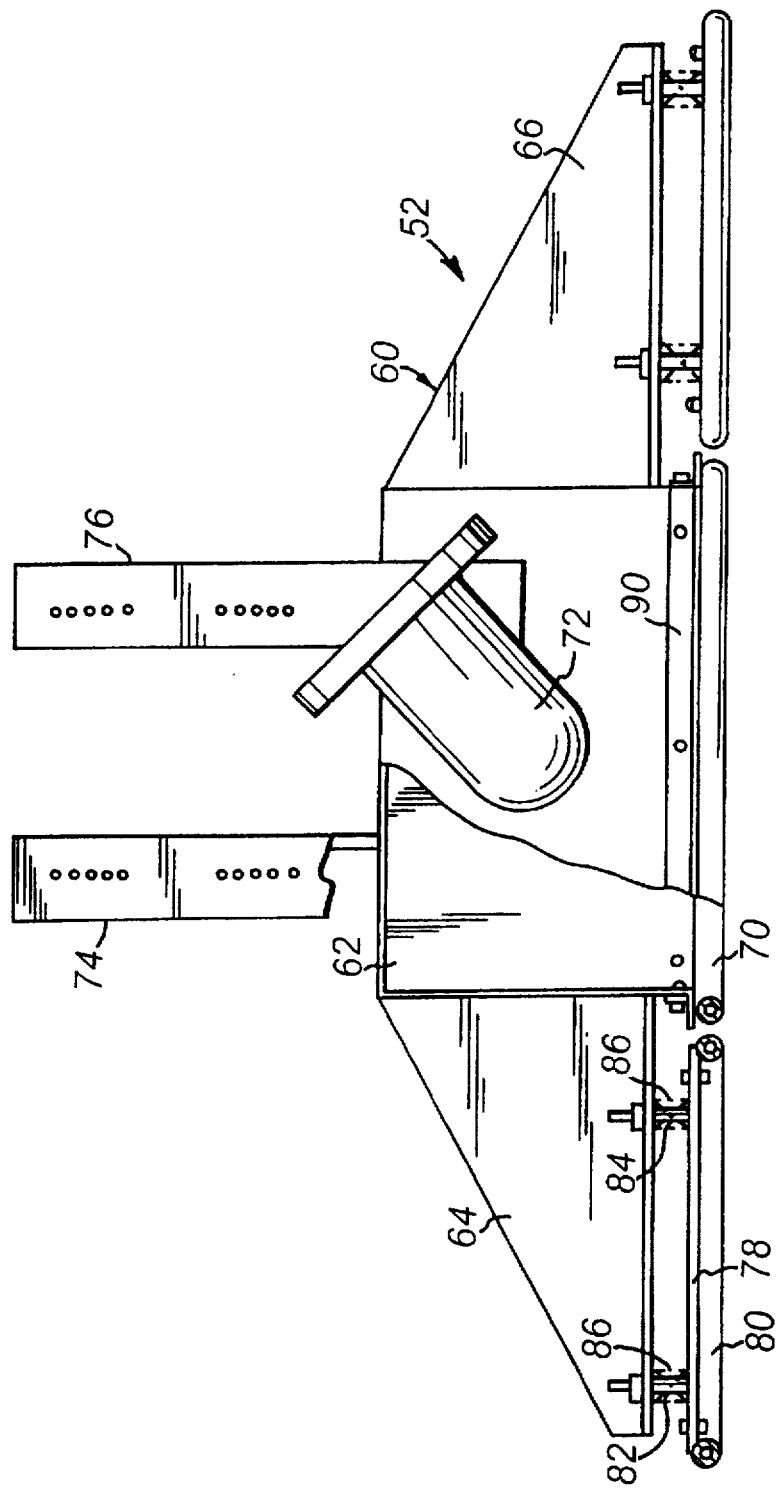
FIG. 4 is a plan view of a backwash sealing shoe in accordance with the invention.
Figure 5:
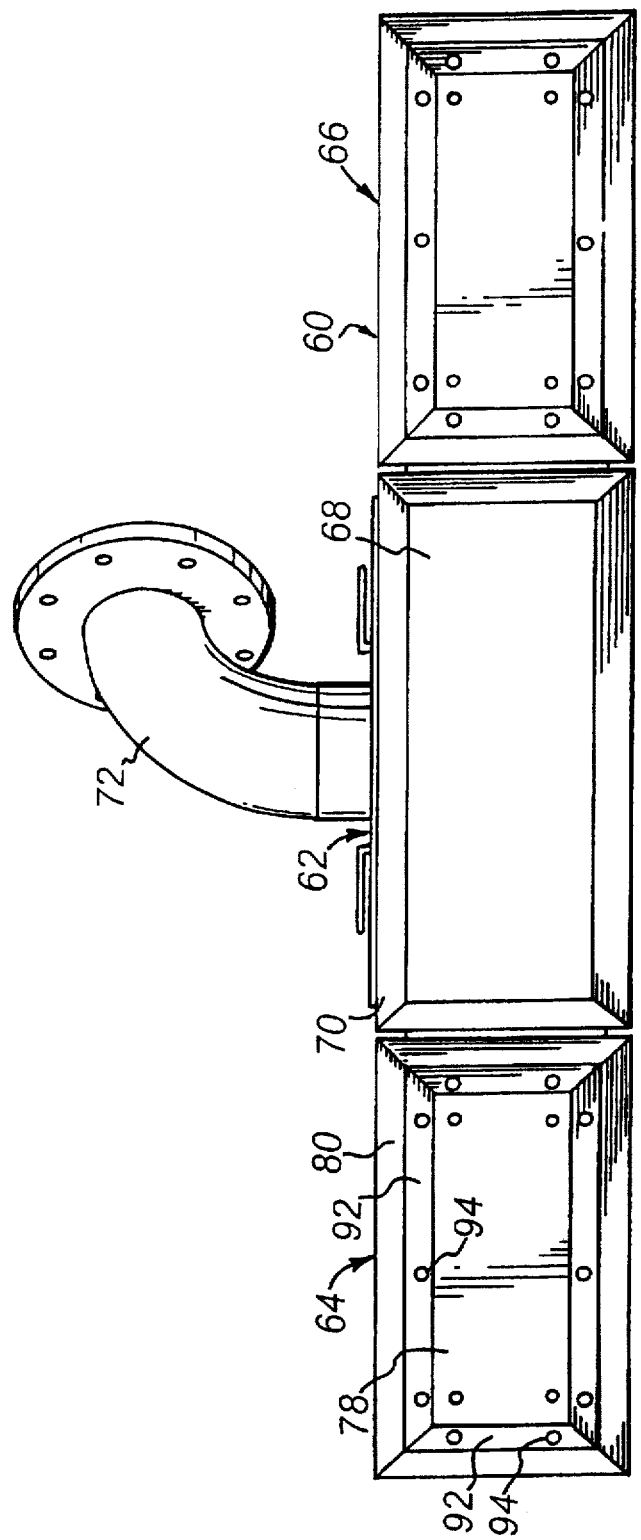
FIG. 5 is a front elevation of FIG. 4.
Figure 6:
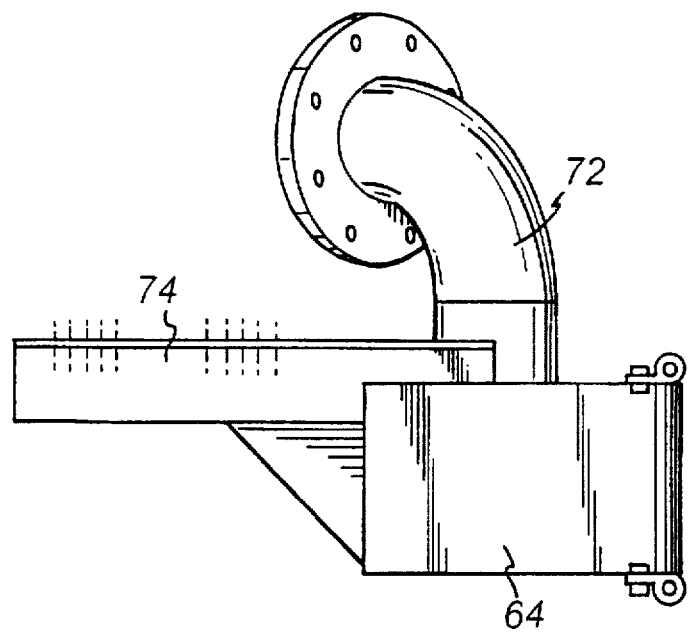
FIG. 6 is a side elevation of FIG. 5.
Figure 7:
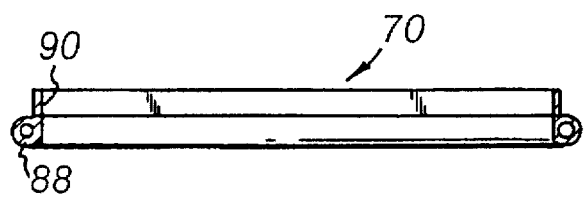
FIG. 7 is a section taken along line 7—7 of FIG. 8.
Figure 8:
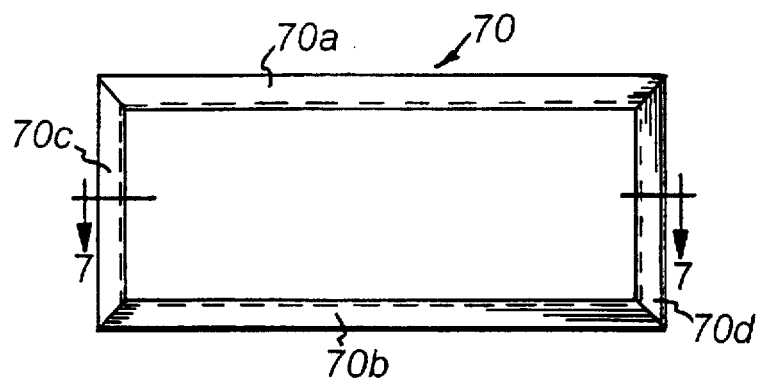
FIG. 8 is a front elevation of a sealing strip in accordance with the invention.

Both the seal 80 and the seal 70 are formed from "P" shaped material also known as "P strip". FIGS. 7 and 8 illustrate the seal 70 and the manner in which seal sections 70a, b, c and d are mitered together to form the closed rectangular shaped seals. The seal 70 includes a tubular sealing section 88 and an attachment flange section 90, best seen in FIG. 7. Referring back to FIG. 5, it can be seen that the attachment flange portion 92 of the seal 80 is secured to the plate 78 by means of suitable fasteners 94 and it is noted that the flange portion of the seal is secured to the front face of the plate. The seal 70 on the center hydraulic section 62 is arranged so that the flange portion 90 is secured to the top, bottom and side surfaces of the section 62 as is best seen in FIG. 4.

It should be pointed out here that while the lateral headers 36 and associated ports 50 are round, the center hydraulic section opening 68 as well as the blocking section plates 78 are rectangular in shape. As a result, the size of the opening 68 and the plates 78 can be modified as necessary to surround one or more of the ports 50. In other words, the hydraulic center section, and specifically, the opening 68, may be sized so that the backwash water from the filtrate channel may be supplied to one or more laterals 36 simultaneously. Similarly, the size of the plates 78 may be modified to cover one or more adjacent laterals on either side of the one or more laterals undergoing backwash.

With the above described arrangement, it may be seen that the backwash water will flow through the opening 68 into one or more lateral headers 36 undergoing backwash via ports 50. At the same time, the blocking sections 64, 66 will prevent any migration of backwash water from the area being backwashed and out into the filtrate channel 24 through the lateral headers and ports on either side of the area being backwashed. This makes the path of least resistance of hydraulic flow upwardly through the filter bed and into the backwash hood 34 in such a manner that the fluidization and media cleansing of the filtration bed area being backwashed is achieved effectively and efficiently.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of backwashing an undivided filtration bed in a travelling bridge filtration system wherein said tank has a plurality of parallel headers within said bed, each header in communication with a respective port in a wall of said tank, each said respective port in communication with a filtrate channel, the method comprising the steps of:
   a) moving a sealing shoe located in said filtrate channel and having a hydraulic section and at least one adjacent blocking section into engagement with said wall, such that said hydraulic section sealingly engages said wall about at least one of said ports, and such that said at least one blocking section sealingly engages at least one additional of said ports adjacent said at least one port engaged by said hydraulic section;
   b) introducing backwash liquid from said filtrate channel through said hydraulic section into said at least one port sealingly engaged by said hydraulic section, wherein backwash liquid introduced through said hydraulic section is prevented from flowing back into said filtrate channel through said at least one adjacent port during backwashing.

2. The method of claim 1 wherein said sealing shoe is provided with blocking sections on either side of said hydraulic section.

3. The method of claim 1 and including repeating steps a) and b) for each of said respective ports.

4. A filtration system including a tank having an undivided filtration bed and a plurality of side-by-side headers within said bed, each header in communication with a respective port in a wall of the tank, and each port in communication with a filtrate channel adjacent said filtration bed, a sealing shoe movable into and out of engagement with said wall in a direction substantially perpendicular to said wall, said sealing shoe comprising a hydraulic section including an opening surrounded by a seal and adapted to sealingly engage said wall in surrounding relationship to at least one of said ports; and at least one blocking section adjacent said hydraulic section on one side thereof and including a plate surrounded by a seal and adapted to sealingly engage said wall in surrounding relationship to at least one adjacent port so that, during a backwash operation, backwash flow from said filtrate channel entering said filtration bed through said opening in said hydraulic section of said shoe is prevented from escaping back into said filtrate channel through said adjacent port.

5. The system of claim 4 including a conduit extending between said hydraulic section and a backwash pump.

6. The system of claim 4 wherein said seal is comprised of a resilient, flexible material having a substantially P-shape in cross-section.

7. The system of claim 4 wherein said at least one blocking section is spring mounted so as to be biased in a direction toward said wall.

8. The system of claim 4 wherein said sealing shoe includes a second blocking section on the other side of said hydraulic section.

9. The system of claim 8 wherein each blocking section is spring mounted so as to be biased in a direction toward said wall.

10. The system of claim 4 wherein said hydraulic section opening is shaped and sized to surround more than one of said ports.

11. The system of claim 10 wherein said plate is sized and shaped so that the seal mounted on said plate surrounds more than one of said adjacent ports.

12. The system of claim 10 wherein said hydraulic section opening is rectangular in shape.

13. In a travelling bridge filtration apparatus including a tank having a pair of side walls, a pair of end walls and a floor defining a filtration basin including a downflow filtration bed, a bridge adapted to travel across the top of the tank in a first direction, said bridge supporting a backwash pump, a backwash hood and an enclosed waste water removal manifold, and wherein the tank further includes a partition wall forming a filtrate channel adjacent the filtration basin for removing filtered effluent from the tank, said partition wall having a plurality of ports therethrough, the improvement wherein said filtration bed is not partitioned and wherein an underdrain is provided which comprises a plurality of hollow, tubular headers extending in horizontally spaced relationship through said bed and in communication with said filtrate channel; each tubular header being provided with a plurality of apertures along its length and being in communication with one of said ports; and further wherein said backwash pump is placed in selective fluid communication with each of said plurality of hollow tubular headers by means of a sealing shoe having a fluid opening therein, flanked by blank blocking sections, and movable with said bridge in said first direction in a non-sealing mode and movable in a second direction transverse to said first direction into sealing engagement with one or more of said ports to thereby provide fluid access to one or more of said headers while simultaneously blocking access to said one or more adjacent headers so that, during backwash of a discrete portion of the filtration bed, backwash flow from said filtrate channel entering said filtration bed through said opening in said hydraulic section of said shoe is prevented from escaping back into said filtrate channel through at last one adjacent port.

14. The apparatus of claim 13 wherein said sealing shoe comprises a hydraulic section including an opening surrounded by a seal and adapted to sealingly engage said wall in surrounding relationship to at least one of said ports; and wherein each blank section includes a plate surrounded by a seal and adapted to sealingly engage said wall in surrounding relationship to at least one adjacent port to thereby block flow from said tank through said at least one adjacent port during a backwash operation.

15. The apparatus of claim 14 wherein said plate is sized and shaped so that the seal mounted on said plate surrounds more than one of said ports.

16. The apparatus of claim 14 including a conduit extending between said hydraulic section and said backwash pump.

17. The apparatus of claim 14 wherein said seal is comprised of a resilient, flexible material having a substantially P-shape in cross-section.

18. The apparatus of claim 14 wherein each blank blocking section is spring mounted so as to be biased in a direction toward said wall.

19. The apparatus of claim 14 wherein said hydraulic section opening is shaped and sized to surround more than one of said ports.

20. The apparatus of claim 19 wherein said hydraulic section opening is rectangular in shape.

* * * * *